May 18, 1954     J. A. RAJCHMAN ET AL     2,679,025
MAGNETIC TESTING SYSTEM
Filed May 28, 1952     2 Sheets-Sheet 1

INVENTORS
Jan A. Rajchman
& Milton Rosenberg
BY
ATTORNEY

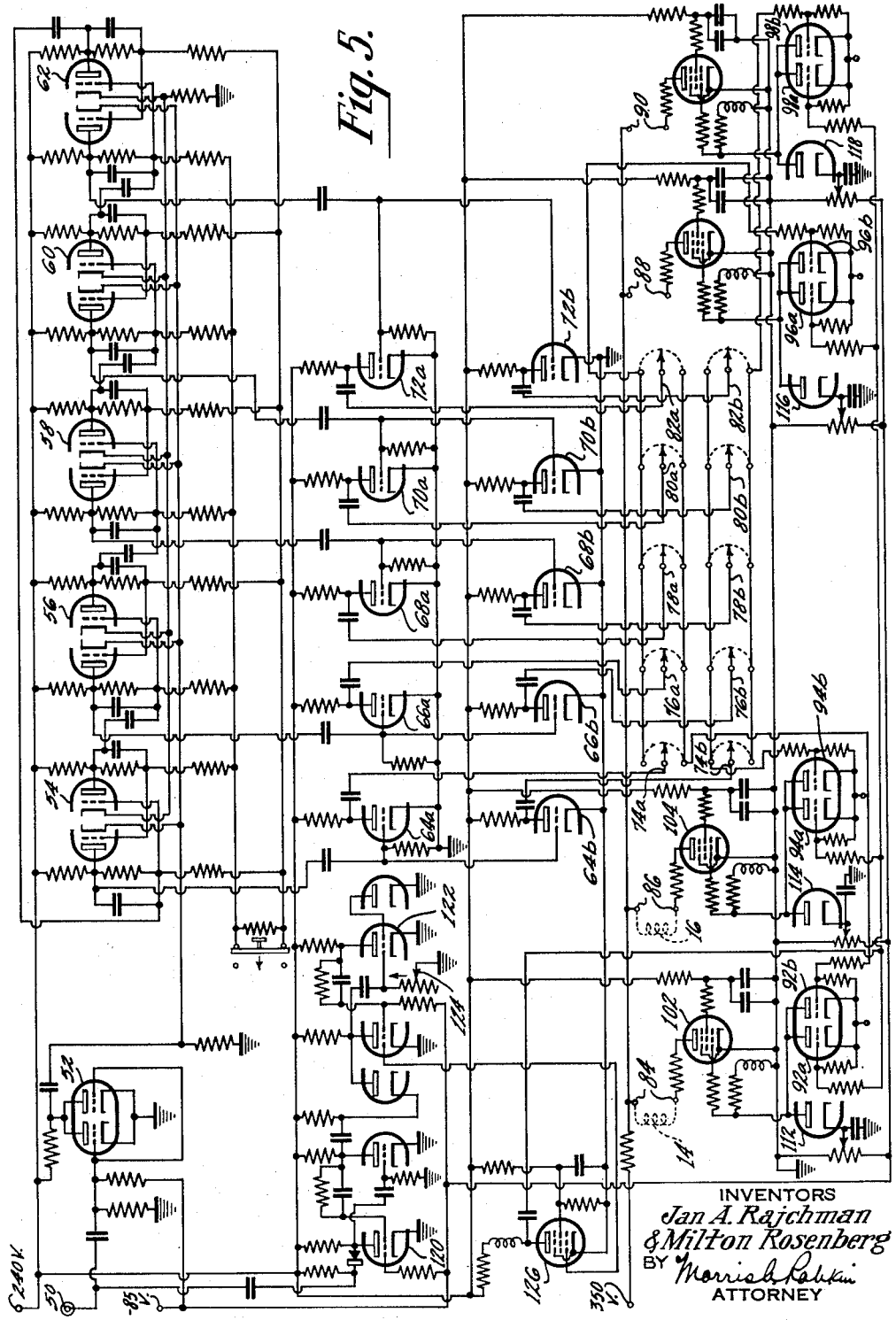

Patented May 18, 1954

2,679,025

UNITED STATES PATENT OFFICE 2,679,025

MAGNETIC TESTING SYSTEM

Jan A. Rajchman, Princeton, and Milton Rosenberg, Trenton, N. J., assignors to Radio Corporation of America, a corporation of Delaware Application May 28, 1952, Serial No. 290,388

15 Claims. (Cl. 324—34)

This invention relates to a magnetic materials testing apparatus. More particularly, it relates to improved apparatus for testing magnetic cores.

One of the preferred methods for testing magnetic materials is to determine its hysteresis characteristic curve. From this such magnetic material parameters as coercive force, remanant and saturated induction, and initial and maximum permeability are obtainable. Most arrangements in the prior art are adapted to test magnetic cores having a physical size that enables them to be magnetically coupled into the test apparatus with relative ease. The testing is usually accomplished by placing the core within primary and secondary coils, the variation in coupling caused by the cores serving to give the test data. Further, their large size makes it easy to use as many turns in the coupled coils as are needed. However, when the core to be tested is small, it becomes difficult to use many turns and, since the cross-sectional area is small, the resultant voltage is lower than is practical for test purposes.

Because of the coupling difficulties with small cores, on the order of one-eighth of an inch in overall diameter, it is quite difficult to obtain a sufficient voltage to permit an observation of a hysteresis loop. It is not practical to use a higher frequency sinusoidal magnetizing force drive upon the material being tested, to obtain more output voltage in a coupling secondary winding, because resulting increased eddy current losses would mask the desired information. A means of overcoming some of these difficulties, in accordance with this invention, is to provide pulsed magnetizing current to drive the material to be tested and to use the resulting voltage developed in a unique pickup coil to provide the required test information. This information may be displayed on the screen of an oscilloscope.

This invention is particularly designed for testing the type of cores that are used in a magnetic matrix memory system for computers, as described by Jay Forrester in "Review of Scientific Instruments," of September, 1951, and other related magnetic switching circuits, which require a multitude of magnetic cores of uniform magnetic properties. These cores are usually toroidal in shape with a relatively small inside diameter. This diameter may be in the order of one-eighth inch or less. The cores used at present are either wound out of very thin rolled metallic alloys on a ceramic bobbin or are cindered ferrospinel types of material. In any case, the uniformity of magnetic properties depends a great deal on the care taken in the manufacturing techniques, which are quite critical.

The cores used in a magnetic matrix memory sytem are required to have a substantially rectangular hysteresis loop so that the residual magnetic induction and the magnetic induction present in a saturated condition are effectively the same. The polarity of the residual magnetism is used to represent the stored information.

All of the cores comprising a matrix are coupled by rows and by columns of cores to individual coils through which information is stored on or read from the individual cores. This is accomplished by applying a current pulse to the coil coupling a particular row of cores and the coil coupling a particular column of cores which couple to a desired coil. The pulses of current supplied to each single turn coil may be one half of the value required to set up a magnetomotive force sufficient to saturate the core. In this manner the one-half H ampere turns (magnetomotive force) from each of the intersecting coils combine to provide a sufficient magnetomotive force to saturate the core in the direction desired. Since, because of the coil grid structure used, these one-half H pulses are applied to the other cores in a row and column of the selected core, there is a possibility that the magnetic polarity of these other cores may be disturbed if a driving pulse is in the opposite polarity to that of these other cores.

Thus, another requirement for a core is that the coercive force of the core must be more than one-half H. If the coercive force were less than one-half H, a pulse of that value and of opposite polarity to the magnetized core would, because of the rectangular hysteresis loop, reverse the magnetism of the core and cause false information to be stored. Also, the coercive force required for a core must be less than H or the current drives used, although adequate for some cores, would not be sufficient to change the magnetic polarity of the core with the excessive coercive force. Consequently, the cores used must have substantially uniform coercive forces following between one-half H and H to allow a uniform drive to be used in the memory system.

Accordingly, it is an object of this invention to provide apparatus adapted to test magnetic cores that are relatively small in size.

A purpose of this invention is to provide apparatus adaptable to be used in the pulse testing of magnetic cores.

It is an object of this invention to provide novel apparatus for permitting the selection of cores having substantially uniform magnetic properties for utilization in a magnetic matrix memory.

Another object of our invention is to provide apparatus for testing magnetic cores under actual service conditions.

A further object of my invention is to establish an improved system for simply, rapidly and cheaply testing a large number of small cores for determining their magnetic properties.

Briefly, in this invention the magnetic toroidal cores are inserted over a long metallic tube of non-magnetic properties such as brass. Inside the tube are placed two or more insulated wires to which current pulses are applied, first to one wire in one direction through the tube and then to the other wire in the opposite direction through the tube. A probe coil contacts the tube on either side of the core so as to effectively form, with the tube, a one turn pickup coil. The voltage induced in the pickup coil, by the changing magnetic flux set up in the test core from the current pulses, is displayed on an oscilloscope. If the resulting waveshape is within allowable limits the core is acceptable.

The invention may be better understood from the following description in conjunction with the accompanying drawings, in which:

Fig. 5 is a circuit diagram of a preferred pulse generator that may be used with the apparatus shown in Fig. 1.

Figure 1:
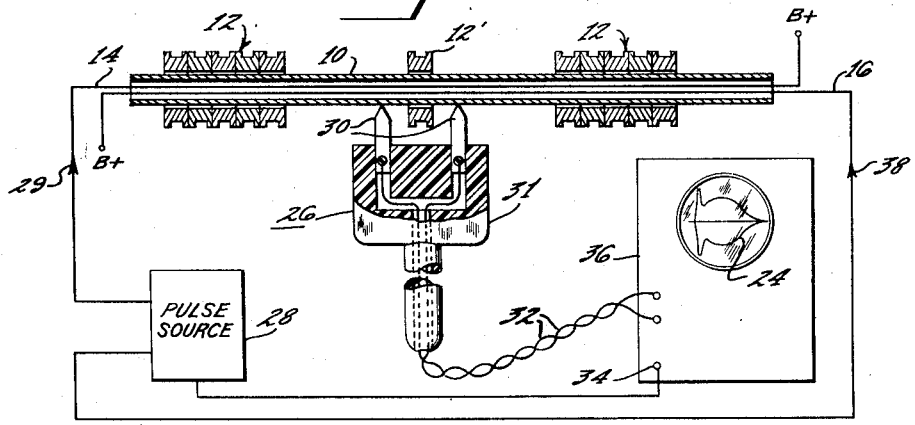
Fig. 1 represents an embodiment of the invention shown in section.

Referring now to Fig. 1, there may be seen in section an embodiment of the invention wherein a long, circular, hollow metal tube 10 is provided. The tube has a diameter small enough to permit toroidal magnetic cores 12, which are to be tested, to be placed over the tube 10. This tube is made out of a non-magnetic but electrically conductive material, such as brass or copper. Two insulated wires 14 and 16 are placed inside the tube 10 in a manner so as to run longitudinally the length of the tube. While two wires are shown by way of example, any number of wires required to produce the required drive may be used. The two wires 14, 16 are each connected individually at either end, respectively, to the output of a pulse source 28, and to a source of B+ for the pulse source. While any suitable pulse source may be used, a preferred type will be set forth in the detailed description of Fig. 2.

A pickup probe 26, is provided with probe contacts 30 which are separated so as to be capable of contacting the tube 10, on either side of a particular core 12' under test. The probe contacts 30, and the length of tube spanning the core which is between the two probe contacts 30, and the lead wires 32, form a one turn pickup coil for the core 12', which is connected to the vertical plates of an oscilloscope 36. While any type of construction of the pickup probe 26 may be used with this invention, one preferred type consists of two contacts 30, and an insulating body 31 shaped to hold the contacts 30. The contacts 30 may be spring snapped on the tube 10, on either side of a core under test, 12', in order to obtain an intimate contact with the tube. The lead wires 32 are connected at one end to the probe contacts 30, and are then twisted to balance out noise and are connected to the vertical input of an oscilloscope 36. These wires are run from the contacts back through the center of the probe handle to allow ease of operation, and to keep these wires out of the operator's way. A synchronizing pulse terminal 34, on the oscilloscope has synchronizing pulses supplied from the pulse source 28 to key the oscilloscope horizontal sweep circuit in conjunction with the test pulses to allow the full individual pulse waveform to be observed.

While the testing of a single core is herein described, the pickup probe may be so constructed by widening the distance between the probe contacts so as to encompass several cores at the same time. This would permit an average of the characteristic of any desired number of the cores to be obtained directly.

Figure 2A:
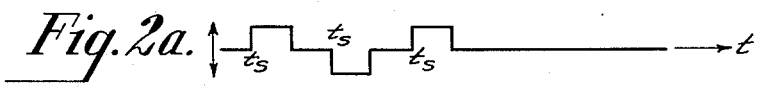
Figs. 2a, 2b and 2c illustrate various wave shapes that may be given to the driving currents used for testing.

In operation, a plurality of the cores to be tested are placed over the metal tube 10. The particular core to be tested is isolated from the remainder so that the test probe may be applied to it individually. In some instances two or more cores may be isolated so that they may be tested as a group, as mentioned above. Current pulses from the pulse generating circuit in any desired sequence, as for example, the sequence shown in Fig. 2a, are applied alternately to the wires 14, 16. A particular schedule of testing pulses will depend on the particular application in which the cores under test will be used. Referring to Fig. 2a, a simple alteration of opposite polarity pulses of equal but opposite amplitudes, is sufficient for some applications and is probably adequate for a routine uniformity test for all applications. The current pulses which supply a positive magnetomotive force are applied through one of the test wires, 14, from the pulse source 28 in one direction, and the current pulses which supply a negative magnetomotive force are applied through the other test wire 16, in the opposite direction. These directions are indicated in Fig. 1 by the arrow heads, 29, 38.

Figure 2B:
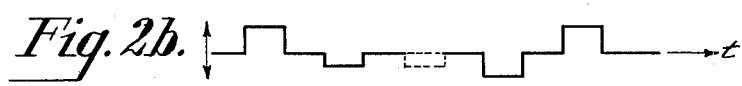
Figure 2C:
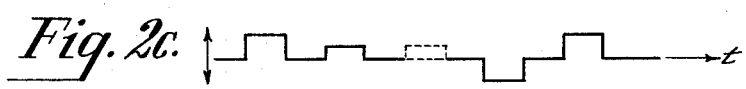

Other pulse schedules, such as represented by the waveshapes in Figs. 2b and 2c, may be useful when the cores are destined to be used in a magnetic matrix system. The schedule shown in Fig. 2b will test for effects due to a half intensity demagnetizing current either by a single pulse or half intensity or a succession of half intensity pulses. Thus a second half intensity pulse is shown in Fig. 2b by dotted lines to indicate that it may or may not be used. Similarly, the schedule represented by the waveshapes of Fig. 2c will test for effects due to partial magnetization in the direction of former magnetization. Other schedules will be obvious to one skilled in the art to test for the particular uses to which cores may be put.

The flux lines, set up around the wires 14, 16, by the current pulses, cut the core or cores under test, the one turn pickup coil formed by the probe 26, and the tube 10. This causes an E. M. F. to be induced in the pickup coil which is fed to the vertical input of oscilloscope 36. To key on the oscilloscope horizontal sweep at the beginning of every current pulse applied to the test wires (shown as $ts$ in Fig. 2a), a keying pulse is applied to the oscilloscope horizontal input synchronizing circuit a few microseconds before the test pulses are applied to the wires 14, 16. In this manner the waveshape in the pickup coil produced by each pulse of current may be observed on the oscilloscope screen. The variations in waveshape will depend, of course, on the characteristics of the particular core or cores being tested, since it is through the low reluctance path of the core under test that most of the flux from the test wires 14, 16 is coupled with the one turn coil formed by the pickup probe 26.

Figure 3:
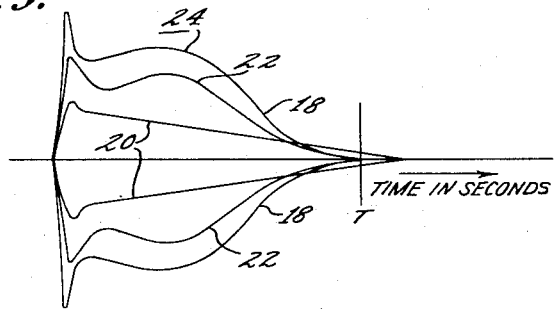
Fig. 3 illustrates typical resultant wave shapes obtained from cores under test.

Thus, by using a reasonably long persistence phosphor in the indicating C. R. tube and/or using a high enough repetition rate, and by a series of test pulses, the various voltage waveforms induced in the output windings of the test core can be observed superposed on each other. A waveshape 24 which is typical of results is shown on the face of the oscilloscope in Fig. 1. This is shown in more detail in Fig. 3. With the application of a current pulse which causes a positive magnetomotive force, the voltage induced in the pickup coil as shown by the waveshape 24 rises very rapidly at first, reaches a maximum, goes through a decay cycle, and gradually falls back to zero. Similarly, a negative magnetomotive force causes substantially the same waveshape to be generated in a negative going direction in the bottom half of the viewing portion of the tube. This waveshape is representative of the hysteresis loop and the effects of eddy currents, or effects due to other causes, such as, sluggishness of boundary motions between magnetic domains, all of which determines the applicability of the cores to be tested. A simultaneous observation of the waveshapes obtained from the successive driving pulses may easily be observed due to persistence of the phosphor screen and/or of vision, with the waveshapes from successive positive and negative pulses presenting the appearance of a top and bottom half to the waveshape 24. Tolerance waveshapes, prescribing limits to the regions within which the waveshapes of an acceptable core should fall may be drawn on a transparent plate superimposed on the face of the oscilloscope. An example of this is shown in Fig. 3. In Fig. 3, these waveshapes are shown with two curves 18, representing the strongest acceptable limits within which a core may fall and two curves 20, representing the weakest acceptable limits. The shaded area indicates the acceptable area within which an average voltage waveshape 22, is shown. Thus, the acceptability of cores may be determined at a glance. A substantially uniform lot of cores for fabrication into a memory may readily be selected.

The placement and removal of the cores on the tube may be done quickly by fastening the wires at one end of the tube permanently and connecting the wires at the other end of the tube to binding posts (not shown). By using a relatively long tube a large number of cores may be tested at one loading without disconnecting the wires.

The use of a metal tube does not prevent the use of rectangular driving pulses containing high frequency components, since the tube has practically no shielding effects at the frequencies of 10 or 100 megacycles. This may be readily seen by considering one of the major losses that the tube could cause, namely, the eddy current loss. Since the eddy currents are proportional to the magnetic permeability and electrical conductivity of the material, the eddy currents induced in the metal tube are negligibly small as compared to those in the magnetic cores under test. This follows because tube material is chosen so that its magnetic permeability is substantially unity as compared to a permeability of 103 to 106 of the magnetic cores.

When the cores or materials to be tested have a relatively low coercive force, the arrangement shown in Fig. 1 of the drawings is readily applicable. If, however, materials having a higher coercive force are to be tested it may be desirable to use a primary having several turns in place of the single turn primary test wires 14, 16 in order to avoid impractically large current pulses. In this case, in order to allow insertion of the cores, the several turns of the primary windings must be opened. This may be accomplished in a number of ways which would be apparent to one using the apparatus. One scheme that may be used is to break each turn of the winding by binding posts in the exact same manner as was described in the case of a single turn coil. In this way the cores would be easily mountable over the tube 10 by disconnecting the wires from the binding posts and further, any number of turns could be readily inserted into the circuit by simply connecting up the proper binding posts.

Figure 4:
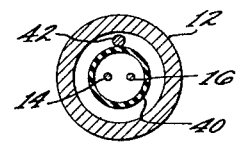
Fig. 4 is a drawing of an end view in section of another embodiment of the invention.

Figure 4 is an end view in section of another embodiment of the invention. Here, as was shown in Fig. 1, the two wires 14, 16 which are used to provide the drive for a magnetic core under test are threaded through the center of a hollow tube 40 upon which a core 12' under test is mounted. The tube 40 may be made of insulating material. A bare wire 42 may be laid alongside the tube with the magnetic cores fitted over the wire and tube. The wire 42 may be fitted into a longitudinal groove in the tube 40 in order to permit cores having narrow openings to be accommodated; or if desired the tube may be fabricated with a longitudinal conducting strip made of non-magnetic metal. The probe 26 has its endings adapted to contact the wire 42. The operation and results obtainable with this embodiment of the invention is the same as with the embodiment of the invention shown in Figure 1.

Circuits to achieve a wide variety of pulsing waveforms and for varying the amplitude and duration of the applied magnetomotive forces can be designed in many different ways by those skilled in the art. The circuit of a preferred embodiment of a pulse source is shown in Fig. 5. A repetitive square wave pulse from an external square wave generator (not shown), is applied to the input terminal 50 and from there is applied to the grid of tube 52. While any known square wave generator to provide the square wave pulse may be used, one suitable type is described in Reich, "Theory and Applications of Electron Tubes," 1944, pages 359 and 360. The pulse is sharpened and amplified by tube 52, and applied to a five place ring countercircuit consisting of double triode tubes 54, 56, 58, 60 and 62, each of which is connected in a trigger circuit. One side of the output of each of these countertubes is connected to the paralleled grids of two buffer tubes 64a and b to 72a and b, respectively. Each buffer tube has a single pole, double throw switch with a neutral position 74a and b to 82a and b respectively connected to its anode.

The pulse circuit is provided with four sets of output terminals 84, 86, 88, 90. The wires 14, 16 may be connected to any two of these. The single pole, double throw switches with a neutral position provide the proper switching arrangement to energize the two of the four sets of output terminals to which the wires are connected. The single pole, double throw switches 84, 86, 88, 90 connect the output of the buffer tubes to four dual gate driver gate tube circuits 92a and b to 98a and b, respectively, the outputs from which are applied to four power amplifier output tubes 102, 104, 106, 108. The driver gate tubes have their anodes connected together and then connected to the grids of the power amplifier tubes, 102, 104, 106, 108. Both the a and b sections of the gate tubes 92a and b to 98a and b are normally conductive. Diode clamps, 112, 114, 116, 118 set the output level of the power amplifiers.

The driver gate tubes 92a and b to 98a and b inclusive are actually dual gate tubes in order to permit variation in the width of the pulses used for testing. Tubes 92b to 98b inclusive may have pulses applied from the ring counter depending upon the position of the single pole, double throw, selection switches. These tubes constitute the first gate. If these were the only gates associated with the driving of the output tubes, the pulse width could not be varied without varying the frequency of the ring counters, consequently tubes 92a to 98a, constituting the second gates, are used. To drive the second gates, a single shot delay multivibrator 120, which has a single cycle for each trigger pulse applied, otherwise called a delay univibrator, is triggered by the same input pulse from the pulse generator that triggers the ring counter 54—62. The output of the delay univibrator 120 is fed to a second univibrator 122 which generates a variable width output pulse. The selection of the pulse width is made by adjusting potentiometer 124 until the desired pulse width is obtained. This univibrator 122 is triggered by the back end of an output pulse from the delay univibrator 120. The output pulse from univibrator 122 is then applied to the grids of the second gate tubes 92a to 98a inclusive, through a buffer tube 126. The circuits are arranged so that the gate tubes 92b to 98b, may receive a 500 microsecond pulse from the counter and gate tubes 92a to 98a, receive a pulse from the delay univibrator tube 122, which may be varied between 2 and 200 microseconds during the time any one of tubes 56a to 59a inclusive are excited from the counter. The keying of the b side of the gates by a variable width pulse, during the selection time of the a side yields a combined pulse of sufficient amplitude to overcome the bias of the power amplifier tubes and produce a variable width output pulse to the test circuit.

It is obvious that two or more of the output terminals 84, 86, 88, 90 may be connected to the same test wire, either 14 or 16 in the test apparatus. The pulse circuit may then be programmed in such a way that there is obtained either one of the pulse amplitudes or their sum. The pulse to key the horizontal sweep of the oscilloscope is obtained from the delay univibrator 120.

In summary, the function of this pulse circuit is to generate a sequence of pulses which can be varied in amplitude and width. The sequence of pulses can be so programmed as to give any combination of pulses, and one, two, three or four channels in a five pulse single sequence.

There has been shown and described hereinabove, novel, rapid and simple apparatus for testing the properties of relatively small magnetic cores under operating conditions.

What is claimed is:

1. A device for testing the characteristics of magnetic cores comprising a non-magnetic hollow tube having a longitudinally disposed electrically conductive portion, said tube being adapted to have mounted thereon magnetic cores to be tested, a wire threaded through said tube, means for applying a current pulse to said wire, a probe, said probe including an open coil having two spaced conducting endings adapted to contact said electrically conducting portion on either side of a core, said open coil forming with said portion a one turn coil closed through said core under test, and means coupled to said coil to display voltages induced in said coil.

2. A device for testing the characteristics of magnetic cores comprising an electrically conductive non-magnetic hollow tube adapted to have mounted thereon magnetic cores to be tested, a wire threaded through said tube, means for applying current pulses to said wire, a single turn pickup coil, and means for completing said single turn pickup coil through said tube to be linked with one of said cores during test thereof, whereby an E. M. F. may be induced in said coil from said excited wire.

3. Apparatus for testing toroidal specimens of magnetic material comprising a hollow tube made of non-magnetic conductive material and adapted to have mounted thereon said toroidal specimens, at least two wires inserted through said tube, means for applying current pulses to said wires, and a probe, said probe having an open coil with two contact endings which are adapted to contact said tube on either side of one of said specimens to be tested, thereby forming a one turn pickup coil through said specimen, and means coupled to said probe to display the voltage induced in said coil from said wires.

4. A device for testing the characteristics of magnetic cores comprising an electrically conductive, non-magnetic hollow tube adapted to have mounted thereon magnetic cores to be tested, a wire inserted through said tube, means for applying current pulses to said wire, a probe, said probe forming an open coil having conducting contact endings adapted to contact said tube on either side of at least one of said cores, said open coil completing a one turn coil through said tube whereby a voltage may be induced in said pickup coil from said wire, and display means connected to said probe coil whereby said induced voltage may be displayed.

5. A device for testing the characteristics of toroidal magnetic cores comprising a non-magnetic electrically conductive hollow tube adapted to have mounted thereon magnetic cores to be tested, at least two wires placed inside said tube, parallel to the walls of said tube, means for applying current pulses alternatively to said wires in opposite directions through said tube, a single turn open pickup coil having probe contact endings, means for clamping said probe contact endings to said tube on either side of one of said magnetic cores to close said pickup coil whereby a voltage may be induced therein from said wires, and means to which said pickup coil is coupled to display said induced voltage.

6. A device for testing the characteristics of toroidal magnetic cores of the type described in claim 5 wherein said tube is made of brass.

7. A device for testing the characteristics of toroidal magnetic cores of the type described in claim 5 wherein said tube is made of copper.

8. A device for testing the characteristics of toroidal magnetic cores as described in claim 5 wherein said display means is a cathode ray oscilloscope.

9. A device for testing the characteristics of toroidal magnetic cores comprising a non-magnetic electrically conductive hollow tube, said tube being adapted to have mounted thereon magnetic cores to be tested, at least two wires placed inside said tube, parallel to the walls of said tube, means for applying current pulses alternatively to said wires in opposite directions through said tube, a single turn open pickup coil having probe contact endings, means for clamping said probe contact endings to said tube on either side of one of said magnetic cores to close said pickup coil whereby a voltage may be induced therein, a cathode ray tube having horizontal and vertical deflecting means, means to apply horizontal deflection voltages to said horizontal deflecting means responsive to the application of current pulses by said means for applying current pulses, and means to apply the voltages induced in said pickup coil to said vertical deflecting means.

10. A device for testing the characteristics of toroidal magnetic cores comprising a non-magnetic hollow tube, a conductive wire positioned alongside of and extending the length of said tube, said tube and said wire being adapted to have mounted thereover magnetic cores to be tested, at least two wires placed inside said tube, parallel to the walls of said tube, means for applying current pulses alternatively to said wires in opposite directions through said tube, a single turn open pickup coil having probe contact endings, means for clamping said probe contact endings to said conductive wire alongside said tube on either side of one of said magnetic cores to close said pickup coil whereby a voltage may be induced therein, a cathode ray tube having horizontal and vertical deflecting means, means to apply horizontal deflection voltages to said horizontal deflecting means responsive to the application of current pulses by said means for applying current pulses, and means to apply the voltages induced in said pickup coil to said vertical deflecting means.

11. A device for testing the characteristics of magnetic cores comprising a non-magnetic member having a longitudinal dimension and adapted to receive around the outer surface thereof magnetic cores to be tested, said member being provided with longitudinally extending electrically conductive means accessible from outside of said member, an electrical conductor extending longitudinally along said member, and a probe, said probe including an open coil having spaced electrical contacts movable into and out of contact with said accessible conductive means in bridging relation to a selected core at longitudinally spaced points intermediate the ends of said conductive means to complete with said conductive means said open coil through said selected core.

12. A device for testing the characteristics of magnetic cores comprising a non-magnetic member having a longitudinal dimension and adapted to support at the outer surface thereof and along said longitudinal dimension magnetic cores to be tested, said member being provided with longitudinally extending electrically conductive means accessible from outside of said member, an electrical conductor extending longitudinally along said member, a probe, said probe including an open coil having spaced electrical contacts movable into and out of contact with said accessible conductive means in bridging relation to a selected core at longitudinally spaced points intermediate the ends of said conductive means to complete with said conductive means said open coil through said selected core, and means for applying currents to one of said open coil and said electrical conductor and for utilizing voltages induced in the other.

13. A device for testing the characteristics of magnetic cores comprising a non-magnetic member having a longitudinal dimension and adapted to receive around the outer surface thereof magnetic cores to be tested, said member being provided with longitudinally extending electrically conductive means accessible from outside of said member, an energizing conductor extending longitudinally along said member, means for applying currents to said energizing conductor, a probe, said probe including an open coil having spaced electrical contacts movable into and out of contact with said accessible conductive means in bridging relation to a selected core at longitudinally spaced points intermediate the ends of said member to complete with said conductive means a pickup coil through said selected core, and means for utilizing voltages induced in said open coil.

14. A testing device as recited in claim 13 wherein said non-magnetic member further includes a tube, and said longitudinally extending electrically conductive means includes an electrically conductive outer surface portion of said tube.

15. A testing device as recited in claim 13 wherein said non-magnetic member further includes a tube made of insulating material, and said longitudinally extending electrically conductive means is disposed along the outer surface of said tube.

References Cited in the file of this patent

UNITED STATES PATENTS

| Number | Name | Date |
|---|---|---|
| Re. 21,853 | Atkinson | July 15, 1941 |
| 2,149,387 | Brown | Mar. 7, 1939 |
| 2,202,884 | Zuschlag | June 4, 1940 |
| 2,531,820 | Lindenblad | Nov. 28, 1950 |